United States Patent
Seligmann et al.

(10) Patent No.: US 7,343,150 B2
(45) Date of Patent: *Mar. 11, 2008

(54) LOG-BASED RINGTONES

(75) Inventors: Doree Duncan Seligmann, New York, NY (US); Taryn Moody, Atlantic Highlands, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 87 days.

This patent is subject to a terminal disclaimer.

(21) Appl. No.: 10/881,908

(22) Filed: Jun. 30, 2004

(65) Prior Publication Data

US 2006/0003742 A1 Jan. 5, 2006

(51) Int. Cl.
*H04M 1/663* (2006.01)
*H04M 1/00* (2006.01)
*H04Q 7/22* (2006.01)
*H04Q 7/20* (2006.01)

(52) U.S. Cl. .................. 455/412.2; 455/412.1; 455/466; 455/567; 455/550.1; 455/556.1

(58) Field of Classification Search .. 455/414.1–414.4, 455/3.06, 401, 415, 412.1–412.2, 418–419, 455/432.3, 466, 567, 550.1, 556.2, 566; 379/372, 418–419, 374.01, 375.01, 373.01, 379/373.02, 373.03, 373.04, 178–179, 201.02, 379/207.16

See application file for complete search history.

(56) References Cited

U.S. PATENT DOCUMENTS

| 5,001,709 A | * | 3/1991 | Satoh .................. 370/524 |
| 5,241,586 A | | 8/1993 | Wilson et al. |
| 5,661,788 A | * | 8/1997 | Chin ................... 379/142.01 |
| 5,870,684 A | * | 2/1999 | Hoashi et al. ............ 455/567 |
| 6,363,258 B1 | * | 3/2002 | Schmidt et al. ............ 455/514 |
| 6,381,322 B1 | * | 4/2002 | Spencer ................ 379/208.01 |
| 6,532,477 B1 | | 3/2003 | Tang et al. |
| 6,675,026 B2 | | 1/2004 | Yoon |
| 6,944,284 B2 | * | 9/2005 | Goodings .............. 379/373.02 |
| 6,950,648 B2 | * | 9/2005 | Pappalardo et al. ..... 455/412.1 |
| 2002/0039914 A1 | | 4/2002 | Hanna et al. |

(Continued)

FOREIGN PATENT DOCUMENTS

EP 0 999 691 A1 5/2000

(Continued)

OTHER PUBLICATIONS

Krollman K. et al, Display End User on Cellular Telephone (Radio), Motorola Technical Developments, Jun. 1999, Motorola Inc.

(Continued)

*Primary Examiner*—Meless Zewdu
(74) *Attorney, Agent, or Firm*—DeMont & Breyer LLC

(57) ABSTRACT

A method is disclosed for determining properties of an output signal that notifies a user of an incoming message, based on information that is available to and associated with the user's telecommunications terminal. In particular, in the illustrative embodiment one or more properties of a musical composition, such as tempo, volume, pitch, rhythm, etc., are varied accordingly in value (e.g., faster versus slower, louder versus softer, etc.). One or more properties of a notifying image or text, if selected, are also varied accordingly.

23 Claims, 8 Drawing Sheets

U.S. PATENT DOCUMENTS

| | | |
|---|---|---|
| 2002/0098875 A1* | 7/2002 | Takenaka .................... 455/566 |
| 2002/0127998 A1 | 9/2002 | Katayanagi |
| 2003/0008687 A1* | 1/2003 | Nishimura .................. 455/567 |
| 2003/0012361 A1* | 1/2003 | Yoshimura ............. 379/373.01 |
| 2003/0026413 A1 | 2/2003 | Brandt et al. |
| 2003/0027605 A1 | 2/2003 | Hijii |
| 2003/0039339 A1 | 2/2003 | Luehrig et al. |
| 2003/0146921 A1 | 8/2003 | Taniguchi et al. |
| 2003/0152205 A1* | 8/2003 | Winkler ................. 379/142.06 |
| 2003/0198322 A1* | 10/2003 | White, Jr. ................ 379/88.19 |
| 2004/0032946 A1 | 2/2004 | Koser et al. |
| 2004/0066932 A1* | 4/2004 | Seligmann ............. 379/373.01 |
| 2004/0213401 A1* | 10/2004 | Aupperle et al. ........... 379/372 |
| 2004/0253993 A1 | 12/2004 | Nakamura |
| 2005/0107128 A1* | 5/2005 | Deeds ........................ 455/567 |
| 2005/0181838 A1 | 8/2005 | Matsuda et al. |

FOREIGN PATENT DOCUMENTS

| | | |
|---|---|---|
| EP | 1 033 857 A2 | 9/2000 |
| EP | 1 330 124 A2 | 7/2003 |
| EP | 1501072 A1 | 1/2005 |
| FR | 2 824 218 A | 10/2002 |
| JP | 11275209 | 10/1999 |
| JP | 2000-253111 A | 9/2000 |
| JP | 2000244633 | 9/2000 |
| JP | 2001-007902 A | 1/2001 |
| JP | 2001-094637 A | 4/2001 |
| JP | 2001-168952 A | 6/2001 |
| JP | 2001 168952 A | 6/2001 |
| JP | 2001-274867 A | 10/2001 |
| JP | 2001-320471 A | 11/2001 |
| JP | 2001358834 | 12/2001 |
| JP | 2002-14200 A | 5/2002 |
| JP | 2003-47043 A | 2/2003 |
| JP | 2003-69662 A | 3/2003 |
| JP | 2003-218999 A | 7/2003 |
| JP | 2003-244280 A | 8/2003 |
| WO | WO 01/49010 A1 | 7/2001 |
| WO | WO 02/087209 A2 * | 10/2002 |
| WO | WO 2004/098162 A1 | 11/2004 |

OTHER PUBLICATIONS

Krollmann K. et al, Display End User on Cellular Telephone (Radio), Motorola Technical Developments, Jun. 1999, Motorola Inc.

* cited by examiner

| Calling Party | Number | Time/Date | Duration |
|---|---|---|---|
| Barb Smith | 732-555-9872 | 01:15pm; 04/22/04 | 01:03:04 |
| Sam Perez | 609-555-0923 | 12:44pm; 04/22/04 | 00:00:12 |
| ... | ... | ... | ... |
| John Doe | 212-555-0964 | 07:32am; 10/23/03 | 00:38:52 |

(b) 402

| Called Party | Number | Time/Date | Duration |
|---|---|---|---|
| John Doe | 212-555-0964 | 01:07pm; 04/22/04 | 00:03:04 |
| Susan Jones | 603-555-1123 | 08:49am; 04/22/04 | 00:59:12 |
| ... | ... | ... | ... |
| Linda Giordano | 415-555-9378 | 09:23am; 10/23/03 | 01:31:32 |

(c) 403

| Calling Party | Number | Time/Date | Call Treatment |
|---|---|---|---|
| Liz Brown | 732-555-6544 | 01:16pm; 04/22/04 | Voice Mail |
| Liz Brown | 732-555-6544 | 11:54am; 04/22/04 | Cell Phone |
| ... | ... | ... | ... |
| Susan Jones | 603-555-1123 | 10:17am; 10/23/03 | Voice Mail |

LOG-BASED RINGTONES

FIELD OF THE INVENTION

The present invention relates to telecommunications equipment in general, and, in particular, to a telecommunications terminal that intelligently decides how to alert the user to the arrival of an incoming message.

BACKGROUND OF THE INVENTION

FIG. 1 depicts telecommunications terminal 100 (e.g., a wireless telephone, a whirling telephone, a personal digital assistant [PA], etc.) in the prior art. Telecommunications terminal 100 is capable of receiving messages (e.g., incoming voice call notifications, email messages, Short Message Service [SIS] messages, Multimedia Message Service [MMS] messages, Instant Messaging [IM] messages, etc.) that originate from other telecommunications terminals via a network such as the Public Switched Telephone Network (PSTN), a wireless cellular network, a wireless local-area network, etc.

When telecommunications terminal 100 receives a message, it notifies its user of the message's arrival—or of the associated incoming call if one is occurring—by playing a "ringtone" (e.g., a tune, a series of beeps, etc.) via speaker 110 and by displaying visual information (e.g., text, an image, etc.) via display 111. Telecommunications terminal 100 might play a particular ringtone for all incoming messages, or a ringtone that is associated with a category of callers (e.g., a ringtone for business contacts, a ringtone for friends, a ringtone for family members, etc.), or a ringtone that is associated with an individual caller, etc. Similarly, telecommunications terminal 100 might display a text message (e.g., "Incoming Call", "Incoming Call: Mom", "Incoming Call: 555-555-5555", etc.) or an image (e.g., an animated icon of a ringing telephone, a photo of the caller, etc.), or both, to indicate that there is an incoming message.

When the user of telecommunications terminal 100 ignores a notification of an incoming call, a record of the call is typically stored in a call log that indicates who the call originator is, what time the call was received, etc., thereby enabling the user to contact the originator at a later time if desired. Typically, a call log also keeps records of calls that are answered by the user and calls that are originated by the user.

SUMMARY OF THE INVENTION

The present invention enables notifying a telecommunications terminal user of an incoming message, based on information from one or more call logs that are associated with one or more telecommunications terminals of the user. In particular, the illustrative embodiment sets the values of one or more properties (e.g., tempo, volume, pitch, rhythm, etc.) of a musical composition, such as a piece of music used in a ringtone, based on information that is stored as part of a call log. Examples of such call log information include: (i) the number of times during a particular time interval that a caller (i.e., an originator) has attempted to contact the user; (ii) the time of the most recent prior communication (e.g., telephone call, email, instant message, etc.) from the originator; etc.

For example, if a telecommunications terminal plays the Beatles song "Hello Goodbye" when a message arrives, the song might be played in a variety of ways, depending on attributes of the message:

- at a faster tempo for each successive message sent by the same originator on the same day,
- as a piano version for the first email of the day received from a given originator,
- at a louder volume when a call from a given caller has already been missed at least once without a return call having been placed to the caller,
- with a higher pitch instead of a lower pitch when the caller is the first party to call in at least two hours, or
- with a lively rhythm when receiving a call from a particular caller for the first time.

As will be appreciated by those skilled in the art, modifying the values of properties such as volume and tempo does not change the fundamental identity of the song. In other words, the melody of the song is independent of these properties and, therefore, the song remains recognizable.

The illustrative embodiment also sets property values of text (e.g., font size, font style, color, etc.) and images (e.g., brightness, size, contrast, resolution, etc.) that are displayed to notify the user of an incoming message or call, based on information from one or more call logs. For example, for an incoming message with high importance as determined by a user-specified criteria (e.g., the first ten messages from a new client, etc.), a text notification for the message might be displayed in a bold font or the color red, or an animated image notification might be played at a faster speed.

In some embodiments of the present invention, one or more property values of the output signal used for notifying the user are set based on one or more attributes of the incoming message. Examples of attributes of the incoming message include who the originator of the message is, a priority level embedded in the message, a subject associated with the message, the semantic content of the message, the location from which the message was sent, etc.

The illustrative embodiment comprises: (a) receiving a message at a first telecommunications terminal; and (b) determining, based on information from at least one call log, the value of a property for a musical composition; wherein the musical composition is for notifying the user of the first telecommunications terminal on the arrival of the message, and wherein the melody of the musical composition is independent of the property.

BRIEF DESCRIPTION OF THE DRAWINGS

FIG. 4 depicts an illustrative organization of information in call log 400, in accordance with the illustrative embodiment of the present invention.

DETAILED DESCRIPTION

The term appearing below is given the following definition for use in this Description and the appended Claims.

For the purposes of the specification and claims, the term "musical composition" is defined as either a piece of music or a sound effect (e.g., one or more beeps, etc.).

Figure 1:
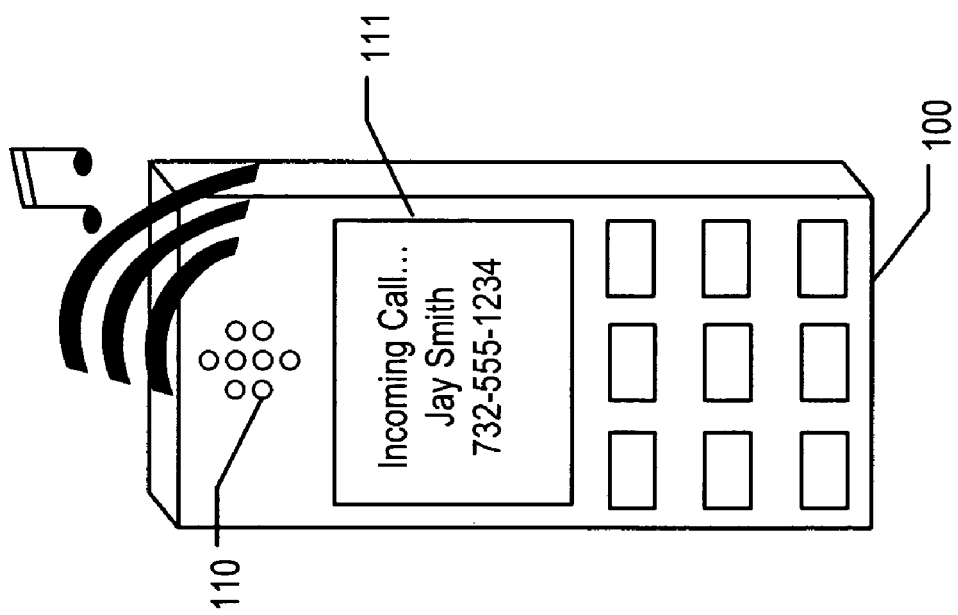
FIG. 1 depicts telecommunications terminal 100 in the prior art.
Figure 2:
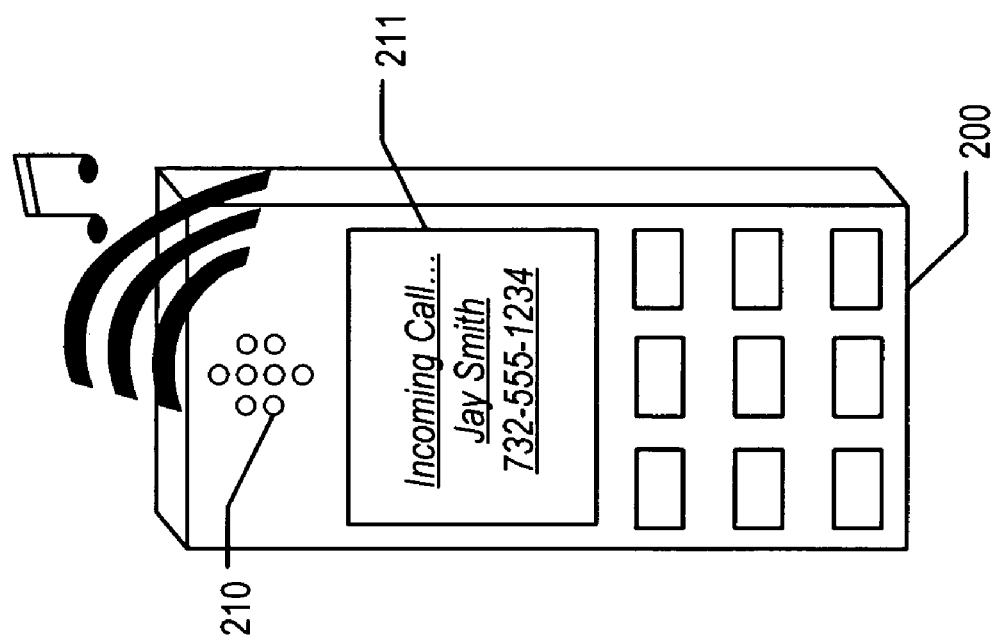
FIG. 2 depicts telecommunications terminal 200, in accordance with the illustrative embodiment of the present invention.

FIG. 2 depicts telecommunications terminal 200 (or "terminal 200") in accordance with the illustrative embodiment of the present invention. As shown in FIG. 2, terminal 200 comprises speaker 210 and display 211. Speaker 210, like speaker 110 of telecommunications terminal 100, is capable of generating acoustic signals (e.g., ringtones, etc.) in well-known fashion. Display 211, like display 111 of telecommunications terminal 100, is capable of displaying visual signals (e.g., text, images, etc.) in well-known fashion.

Figure 3:
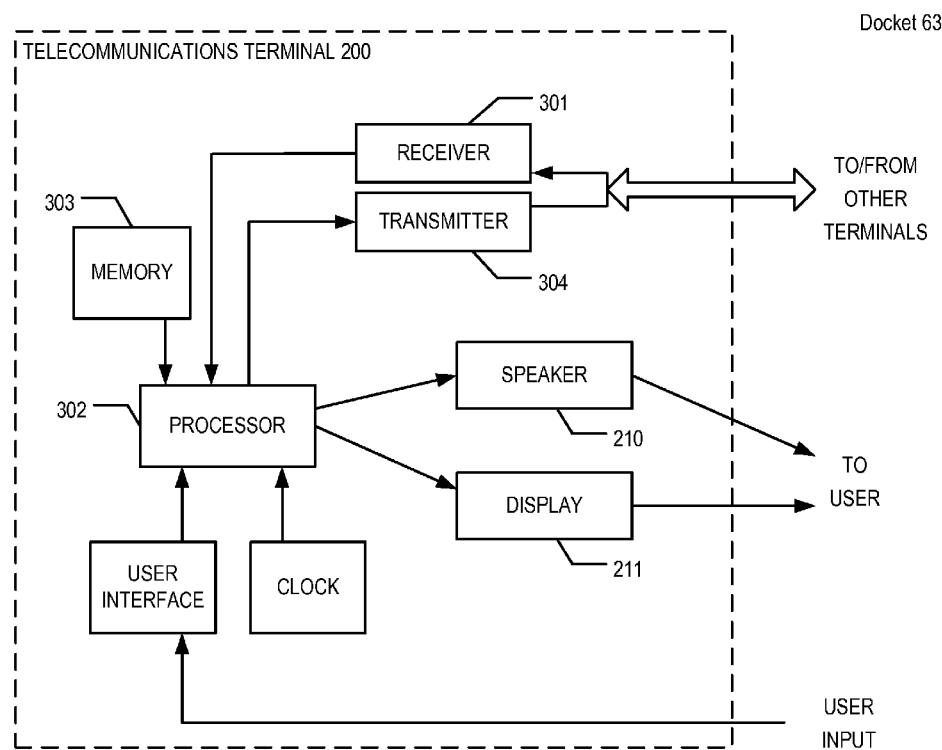
FIG. 3 depicts a block diagram of the salient components of telecommunications terminal 200 in accordance with the illustrative embodiment of the present invention.

FIG. 3 depicts a block diagram of the salient components of terminal 200, in accordance with the illustrative embodiment of the present invention. As shown in FIG. 3, terminal 200 comprises receiver 301, processor 302, memory 303, transmitter 304, speaker 210, and display 211, interconnected as shown.

Receiver 301 receives signals sent from other telecommunications terminals (e.g., via the Public Switched Telephone Network [PSTN], via a Code Division Multiple Access [CDMA] base station, etc.) and forwards the information encoded in these signals to processor 302, in well-known fashion. It will be clear to those skilled in the art, after reading this disclosure, how to make and use receiver 302.

Processor 302 is a general-purpose processor that is capable of reading data from and writing data into memory 303, of sending signals to speaker 210 and display 211 in well-known fashion, and of executing the tasks described below and with respect to FIGS. 5 through 8. In some alternative embodiments of the present invention, processor 302 might be a special-purpose processor. In either case, it will be clear to those skilled in the art, after reading this disclosure, how to make and use processor 302.

Memory 303 stores data and executable instructions, as is well-known in the art, and might be any combination of random-access memory (RAM), flash memory, disk drive, etc. It will be clear to those skilled in the art, after reading this disclosure, how to make and use memory 303.

Transmitter 304 receives information from processor 302 and transmits signals that are encoded with this information to other telecommunications terminals (e.g., via the Public Switched Telephone Network [PSTN], via a Code Division Multiple Access [CDMA] base station, etc.) in well-known fashion. It will be clear to those skilled in the art, after reading this disclosure, how to make and use transmitter 304.

FIG. 4 depicts three tables for an illustrative organization of information in call log 400, in accordance with the illustrative embodiment of the present invention. Call log 400 is a record of call activity that comprises at least a subset of:
  i. All of the calls made and completed to terminal 200 (i.e., "incoming calls");
  ii. All of the calls originating from terminal 200 (i.e., "outgoing calls"); and
  iii. All of the calls made, but not completed, to terminal 200 (i.e., "missed calls").

Incoming log 401 comprises the status of incoming calls. For each incoming call, incoming log 401 comprises: the identity (if known) of the originator of the call, also known as the calling party; the telephone number of the calling party; the time and date of the call; and the duration of the call. The calling party is the person who calls the user of terminal 200.

Outgoing log 402 comprises the status of outgoing calls. For each outgoing call, outgoing log 402 comprises: the identity of the called party; the telephone number of the called party; the time and date of the call; and the duration of the call. The called party is the person who is called by the user of terminal 200.

Missed log 403 comprises the status of missed calls. For each missed call, missed log 403 comprises: the identity (if known) of the calling party; the telephone number of the calling party; the time and date of the call; and the treatment of the call (if known). The call treatment information, if known, indicates if the call was directed to voicemail, directed to another terminal, or handled in another way.

Call log 400 as depicted in FIG. 4 illustrates a record of telephone calls. It will, however, be clear to those skilled in the art, after reading this specification, how to make and use a call log that provides a record of message activity, where the record of message activity is either integrated with or segregated from the record of telephone call activity. Examples of such messages include email messages, Short Message Service [SMS] messages, Multimedia Message Service [MMS] messages, Instant Messaging [IM] messages, etc. A call log that provides a record of message activity is also known as a "message log."

Call log 400 is stored in terminal 200 in accordance with the illustrative embodiment of the present invention. In some embodiments, call log 400 is stored externally to terminal 200 (e.g., at a server, at another telecommunications terminal, etc.). It will be clear to those skilled in the art how to store a call log in terminal 200 or externally to terminal 200 or both.

In addition, call log 400 represents the calls (i.e., incoming, outgoing, and missed) that are associated with terminal 200, in accordance with the illustrative embodiment of the present invention. In some alternative embodiments, call log 400 represents aggregated, individual call logs, where each call log represents the messages that are associated with a different terminal of multiple terminals, all of which being relevant to the user of terminal 200. For example, the user might regularly use several terminals, including terminal 200, and would want all call logs to be considered for determining how to be notified of an incoming message. It will be clear to those skilled in the art how to aggregate individual call logs from multiple terminals for the purpose of retrieving information from an aggregated call log.

Terminal 200 uses the information in call log 400 to derive details with which terminal 200 determines properties of an output signal (e.g., a ringtone, etc.) that is used to notify the user of an incoming call. For example, if Sam Perez were to call at 2:00 pm on Apr. 22, 2004, then it could be readily determined that it has been one hour, sixteen minutes since Sam's most recent prior communication (at 12:44 pm on the same day). As another example, if Liz Brown were to call at 1:30 pm on Apr. 22, 2004, then it could be readily determined that her latest call is her second attempt since 1:00 pm to reach the user of terminal 200. It will be clear to those skilled in the art, after reading this specification, how to derive other details from the information in call log 400.

It will be clear to those skilled in the art, after reading this specification, how to make and use call log 400.

Figure 5:
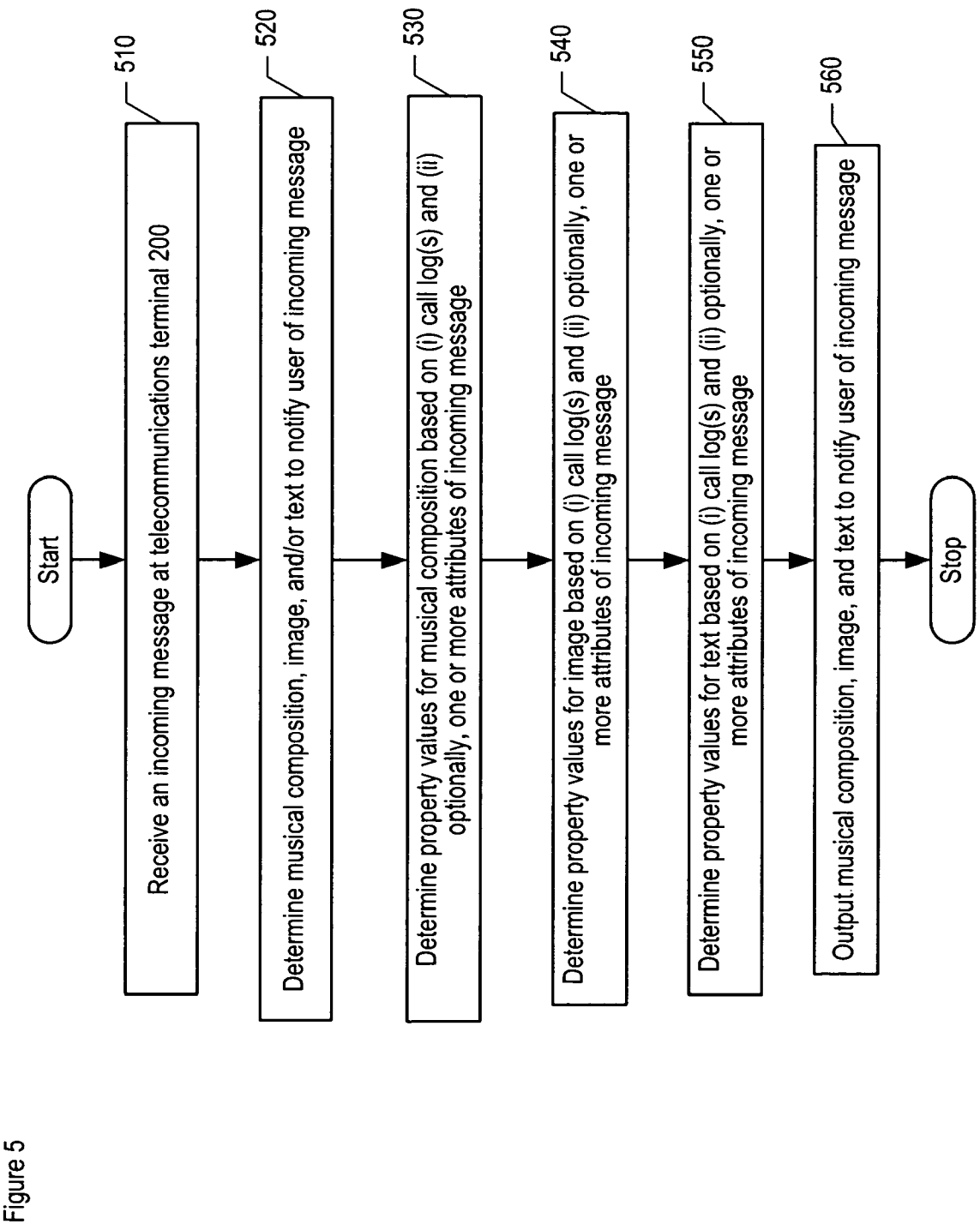
FIG. 5 depicts a flowchart of the salient tasks of telecommunications terminal 200 upon receiving an incoming message, in accordance with the illustrative embodiment of the present invention.

FIG. 5 depicts a flowchart of the operation of terminal 200 upon receiving a message (e.g., an incoming call notification, an email message, etc.), in accordance with the illustrative embodiment of the present invention. It will be clear to those skilled in the art which tasks depicted in FIG. 5 can be performed simultaneously or in a different order than that depicted.

At task 510, receiver 301 of terminal 200 receives a message and forwards the message to processor 302, in well-known fashion.

At task 520, processor 302 determines what musical composition (i.e., making up a ringtone), what image, and what text are to be used to notify the user upon receiving the incoming message, in well-known fashion. In some embodiments, terminal 200 might play a particular musical composition for all incoming messages, or a musical composition that is associated with a category of callers, or a musical composition that is associated with an individual caller, etc. Similarly, in some embodiments terminal 200 might determine one or both of a text message and an image to display for notifying the user on the arrival of an incoming message. As will be appreciated by those skilled in the art, in some embodiments terminal 200 might not output one or more of a ringtone, image, and text based on preferences set by the user, battery power, capabilities of display 211, etc.

At task 530, processor 302 determines the values of one or more properties for the musical composition that was selected at task 520 based on one or more call logs, as described in detail below and with respect to FIG. 6.

Processor 302 retrieves the pertinent information in call log 400 in accordance with the illustrative embodiment of the present invention. In some alternative embodiments, processor 302 examines only the call log entries (i.e., inbound, outbound, and missed) that include the calling party of the current incoming message described at task 510. In some other alternative embodiments, processor 302 examines only the inbound and missed log entries that include the calling party of the current incoming message.

Processor 302 retrieves the pertinent information in call log 400 based on user inputs made at an earlier time (e.g., during initialization of phone service, when starting up the computer at the beginning of the work day, etc.). The user, in this case either the real user of terminal 200 or an administrator of terminal 200 (e.g., the Information Technology [or "IT"] person, etc.), has specified the property (e.g., volume, etc.) of an output notification signal (e.g., a musical composition, etc.) to vary under a certain condition. The user has also specified the condition on which to modify the property's value. The pertinent information retrieved by processor 302 depends on the conditions specified in the user inputs made earlier.

For example, if the condition that is specified in the user input is whether or not the number of times in the same day a call has been received exceeds five, then processor 302 searches the incoming call log and missed call log for calls from the same day only. If the property specified for the output notification signal is volume, then processor 302 makes the volume of the ringtone soft for calls one through five and loud for calls five and beyond.

Optionally, processor 302 also bases the determining of the one or more properties on one or more attributes of the incoming message. For example, processor 302 examines the caller identifier that is a part of the incoming message. In this example, processor 302 is configured by the user to handle all calls from a particular caller, such as Susan Jones, in a different way that calls from other callers. A musical composition to the tune of "Mary Had a Little Lamb" that is associated with Susan Jones can be played loudly for all of her calls, based on her caller identifier.

Furthermore, the musical composition that announces the first call of the day from Susan Jones can be played loudly, but quickly, while the musical composition that announces all other calls of the day from Susan Jones can be played loudly, but slowly. In this example, the volume of the musical composition is determined by an attribute of the incoming message, while the tempo of the musical composition is determined by information from call log 400. Volume and tempo are properties that will be described later in this specification.

At task 540, processor 302 determines the values of one or more properties for the image that was selected at task 520 based on one or more call logs, as described in detail below and with respect to FIG. 7. Processor 302 retrieves the pertinent information in call log 400 in accordance with the illustrative embodiment of the present invention, as described for task 530.

Optionally, processor 302 also determines the values of one or more properties for the image based on attributes of the incoming message, as described for task 530.

At task 550, processor 302 determines the values of one or more properties for the text that was selected at task 520 based on one or more call logs, as described in detail below and with respect to FIG. 8. Processor 302 retrieves the pertinent information in call log 400 in accordance with the illustrative embodiment of the present invention, as described for task 530.

Optionally, processor 302 also determines the values of one or more properties for the text based on attributes of the incoming message, as described for task 530.

At task 560, processor 302 (i) sends a signal to speaker 210 to play the musical composition selected at task 520 in accordance with the property values determined at task 530, and (ii) sends a signal to display 211 to display the image and text of task 520 in accordance with the property values determined at tasks 540 and 550, respectively, in well-known fashion. After task 560 the method of FIG. 5 terminates.

Figure 6:
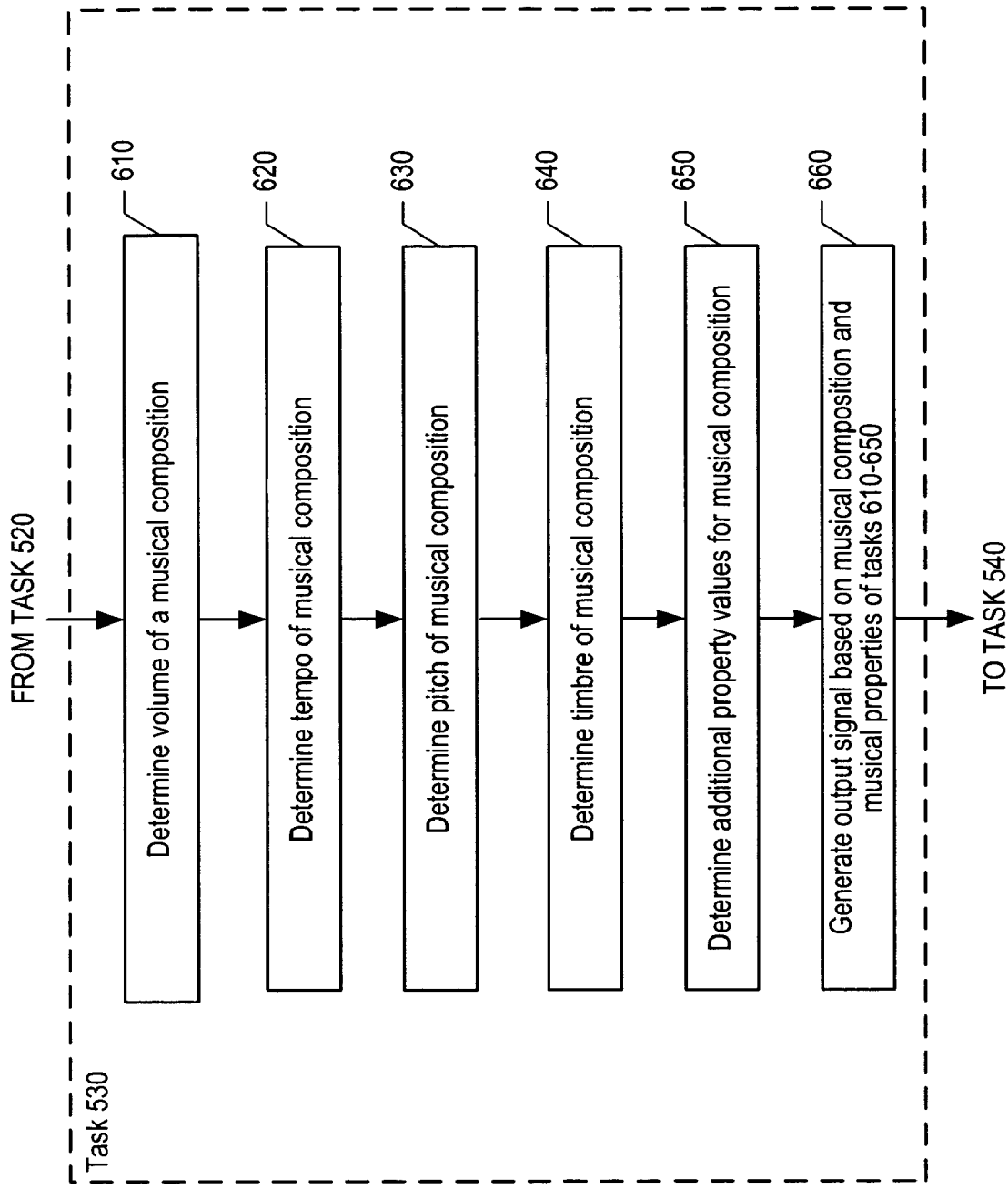
FIG. 6 depicts a detailed flowchart of task 530, as shown in FIG. 5, in accordance with the illustrative embodiment of the present invention.

FIG. 6 depicts a detailed flowchart of task 530 in accordance with the illustrative embodiment of the present invention. It will be clear to those skilled in the art which tasks depicted in FIG. 6 can be performed simultaneously or in a different order than that depicted.

As part of task 530 and based on one or more call logs, terminal 200 determines the values of one or more properties of the musical composition determined at task 520, in accordance with the illustrative embodiment of the present invention. The melody of the musical composition, however, does not change as long as the selected musical composition is in effect.

For example, if the song "Mary Had a Little Lamb" is the musical composition selected, one or more properties of the song might be altered for the purpose of notifying the user. The change in properties can make the song sound louder, sound of a different pitch, or sound as if played by a different instrument than another version of the song. Nevertheless, it is of particular importance that the user of terminal 200 will still be able to recognize the song as "Mary Had a Little Lamb" because the melody remains the same.

It will be clear to those skilled in the art how to select which properties are considered and which are not.

At task 610, processor 302 determines the volume of a musical composition, based on the pertinent call log entries.

The term "volume" refers to the amplitude or loudness of a sound. For example, if Liz Brown has called or instant messaged several times in one day and all her contact attempts wind up as missed (or not responded to), as reflected in the call log, then the volume applied to the user notification of her current incoming message is made louder (or softer) than what was used when she called previously.

At task 620, processor 302 determines the tempo of the musical composition, based on the pertinent call log entries. The term "tempo" refers to the relative speed at which music is played. For example, when Barb Smith calls, as reflected in call log 400, then the tempo applied to the user notification of her current incoming message is made faster (or slower) than what was used to indicate her previous incoming call, or other type of contact attempt (e.g., SIS message, etc.), from the same day.

At task 630, processor 302 determines the pitch of the musical composition, based on the pertinent call log entries. The term "pitch" refers to the relative position of a tone within a range of musical sounds, as determined by this quality. For example, a higher (or lower) pitch is used to denote the first call of the day from a given originator, in which case, the first call from Liz Brown is indicated with a high-pitched notification, while the second (and any other calls) from Liz Brown are indicated with a low-pitched notification.

As another example, a higher (or lower) pitch is used to denote any call made from the 212 area code if preceded in the same day by an outgoing message made to someone in the 212 area code.

At task 640, processor 302 determines the timbre of the musical composition, based on the pertinent call log entries. The term "timbre" refers to the quality of a sound that distinguishes it from other sounds of the same pitch and volume. One example of changing the timbre is changing the musical instrument played. For example, to allow the user of terminal 200 some time to do work between phone calls, a timbre resembling that of a flute is used for all incoming messages received within an hour after the last answered incoming message. Then, a timbre resembling that of a trumpet is used for the next incoming message after the hour has passed.

At task 650, processor 302 determines additional properties (e.g., rhythm, etc.) of a musical composition, based on the pertinent call log entries.

At task 660, terminal 200 generates an output notification signal that is based on the musical composition and properties of tasks 610-650. For a given musical composition, terminal 200 synthesizes the output notification signal, given the melody and the determined properties, in well-known fashion and in accordance with the illustrative embodiment. In some alternative embodiments, terminal 200 selects the output notification signal based on the determined properties from a set of pre-stored waveforms (e.g., a soft flute waveform, a loud trumpet waveform, etc.) for the musical composition, in well-known fashion, where each waveform exhibits a different combination of properties.

The acoustic output notification signal, in some alternative embodiments, is also based on speech messages that are, in turn, based on call log 400. For example, terminal 200 generates a notification message like "This is the fifth time that the caller has called today," or "You last talked with the caller two days ago," or "The caller is calling for the third time, but you have not returned their call." It will be clear to those skilled in the art, after reading this specification, how to associate a notification message with a specified condition. It will also be clear to those skilled in the art how to play a speech notification message.

Figure 7:
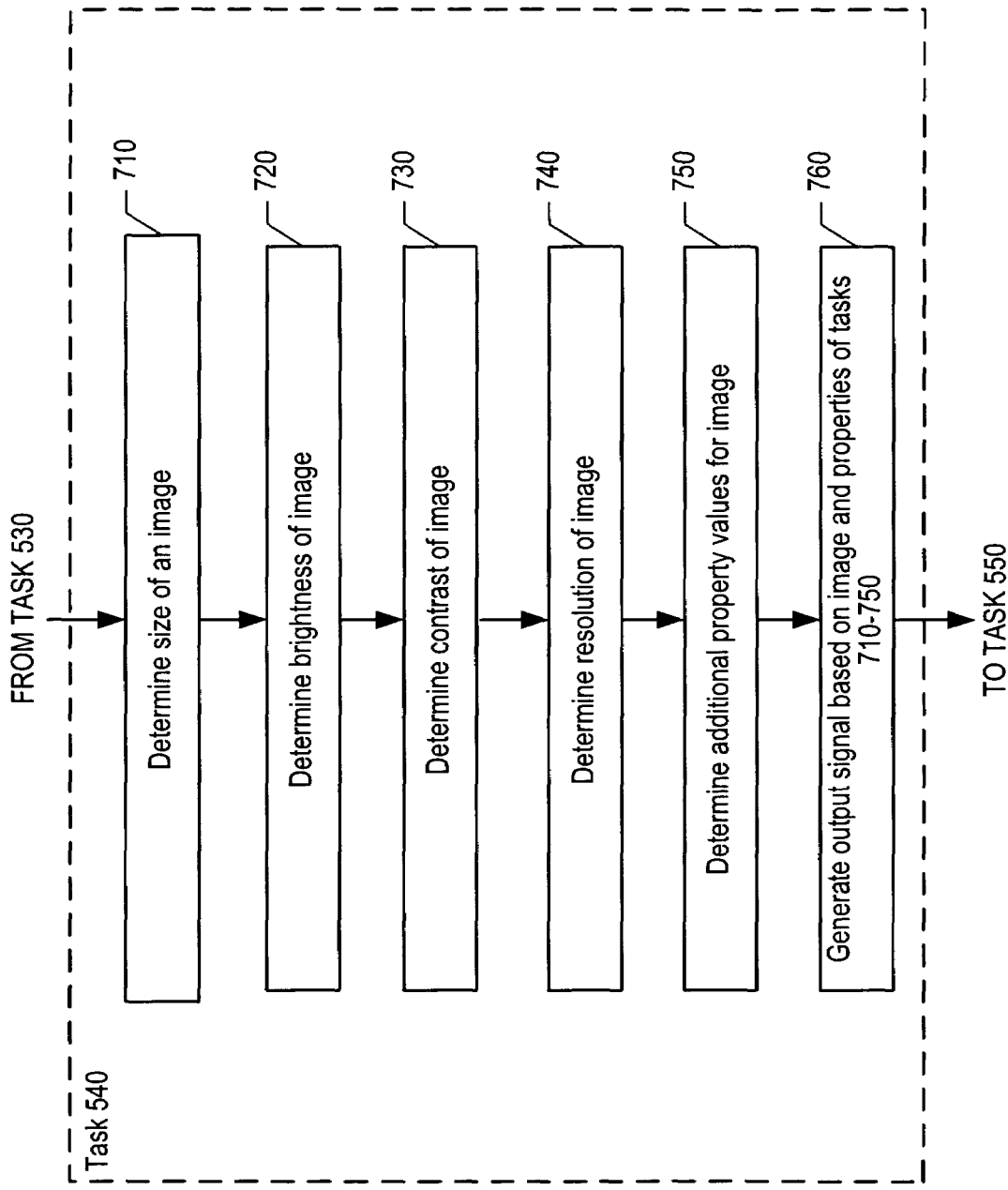
FIG. 7 depicts a detailed flowchart of task 540, as shown in FIG. 5, in accordance with the illustrative embodiment of the present invention.

FIG. 7 depicts a detailed flowchart of task 540 in accordance with the illustrative embodiment of the present invention. It will be clear to those skilled in the art which tasks depicted in FIG. 7 can be performed simultaneously or in a different order than that depicted.

As part of task 540 and based on one or more call logs, terminal 200 determines the values of one or more visual properties of the image, in accordance with the illustrative embodiment of the present invention. The user's ability to recognize the image's patterns, however, does not change as long as the image is in effect.

For example, if a picture of a balloon is the image selected, one or more visual properties of the balloon picture might be altered for the purpose of notifying the user. The change in properties makes the balloon bigger, a different color, or grainier-looking than another image of the balloon. Nevertheless, it is of particular importance that the user will still be able to recognize the picture as being that of a balloon instead of a beach because the recognizable patterns of the picture remain the same.

It will be clear to those skilled in the art how to select which visual properties are considered and which are not.

At task 710, processor 302 determines the size of an image, based on the pertinent call log entries. For example, for each incoming message from a given person on a given day, the size of the object in the selected image is made slightly bigger (or smaller) than before. The call log examples provided for the tasks depicted in FIG. 6 also apply to task 710.

At task 720, processor 302 determines the brightness, or "luminosity," of the image, based on the pertinent call log entries. The call log examples provided for the tasks depicted in FIG. 6 also apply task 720, in that the brightness is increased (or decreased) from one incoming message to another, depending on the information in call log 400.

At task 730, processor 302 determines the contrast of the image, based on the pertinent call log entries. The term "contrast" refers to the difference in brightness between the light and dark areas of an image. The examples provided for the tasks depicted in FIG. 6 also apply task 730, in that the contrast is increased or decreased from one incoming message to another, depending on the information in call log 400.

At task 740, processor 302 determines the resolution of the image, based on the pertinent call log entries. The term "resolution" refers to the fineness of detail that can be distinguished in an image. The call log examples provided for the tasks depicted in FIG. 6 also apply 740, in that the resolution is increased or decreased from one incoming message to another, depending on the information in call log 400.

At task 750, processor 302 determines the additional properties (e.g., hue, saturation, etc.) of the image, based on the pertinent call log entries.

At task 760, terminal 200 generates an output notification signal that is based on the image and image properties of tasks 710-750. For a given image, terminal 200 synthesizes the visual signal, given the specific user-recognizable image and the determined properties, in well-known fashion and in accordance with the illustrative embodiment. In some alternative embodiments, terminal 200 selects the output notification signal based on the determined properties from a set of pre-stored scenes (e.g., a big balloon in fine detail, a small balloon in coarse detail, etc.) for the image, in well-known fashion, where each scene exhibits a different combination of properties.

Figure 8:
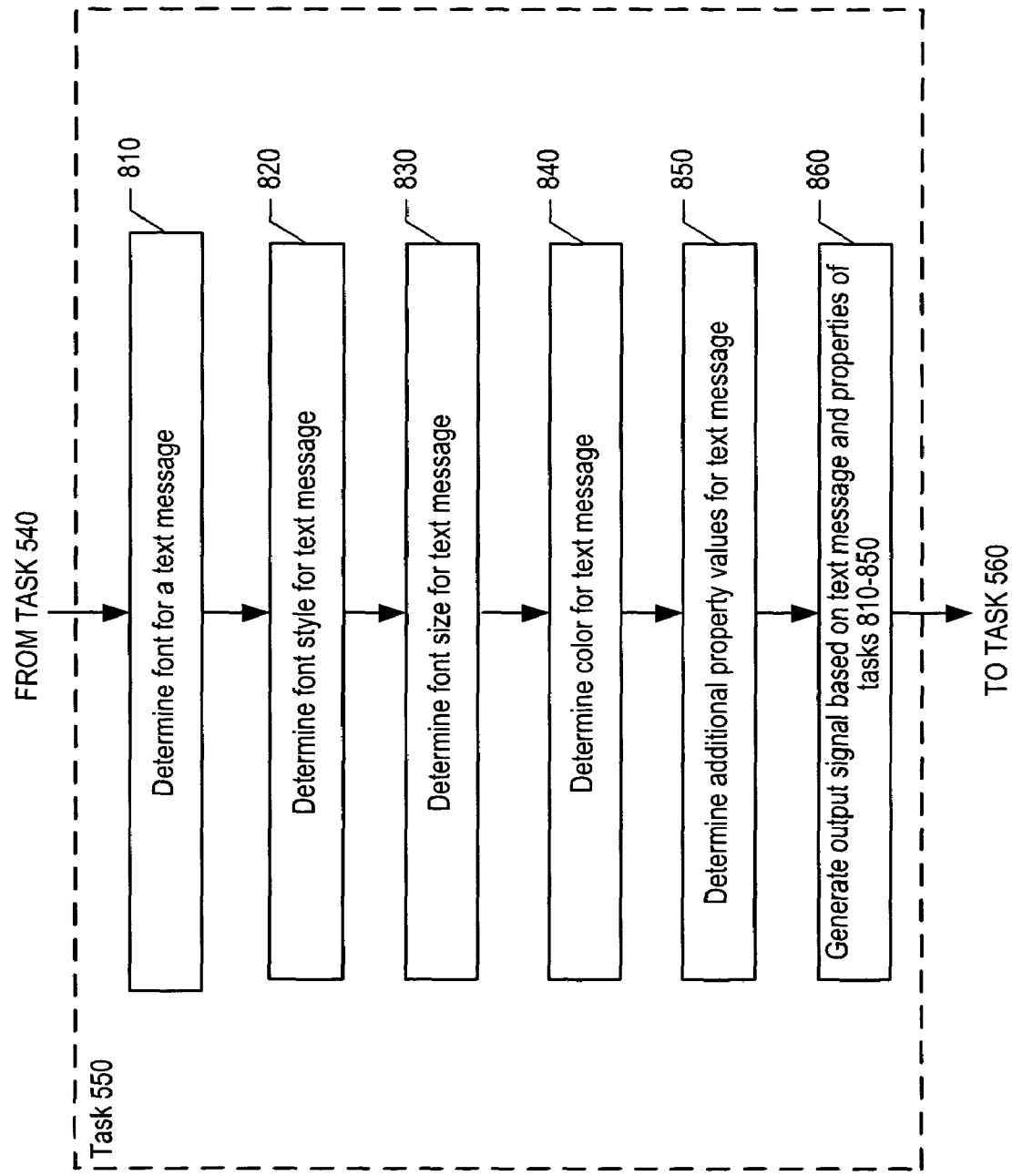
FIG. 8 depicts a detailed flowchart of task 550, as shown in FIG. 5, in accordance with the illustrative embodiment of the present invention.

FIG. 8 depicts a detailed flowchart of task 550 in accordance with the illustrative embodiment of the present invention. It will be clear to those skilled in the art which tasks depicted in FIG. 8 can be performed simultaneously or in a different order than that depicted.

Terminal 200 displays text as part of the output notification signal, where the semantic content of (i.e., the meaning conveyed by) the notifying text is independent of call log 400, in accordance with the illustrative embodiment, but not necessarily independent of the incoming message. For example, if the incoming call is from Liz Brown, terminal 200 might display "Incoming Call" or "Incoming Call from Liz Brown" or "Incoming Call from 732-555-6544." It will be clear to those skilled in the art how to create a notifying text message.

In the actions that constitute task 550, processor 302 determines one or more visual properties of the text that is used to notify the user. It will be clear to those skilled in the art how to select which visual properties are considered and which are not.

At task 810, processor 302 determines the font type (e.g., Arial, Times-Roman, Verdana, etc.) of the text, based on the pertinent call log entries. The call log examples provided for the tasks depicted in FIG. 6 also apply task 810, in that terminal 200 might display the text message, for example, in a Times-Roman font for some incoming messages and in a Verdana font for some other incoming messages, based on the information in call log 400.

At task 820, processor 302 determines the font style (e.g., Regular, Bold, Italic, etc.) of the text, based on the pertinent call log entries. The call log examples provided for the tasks depicted in FIG. 6 also apply to task 820, in that terminal 200 might display the text message, for example, in Regular font for some incoming messages and in Bold font for some other incoming messages, based on the information in call log 400.

At task 830, processor 302 determines the font size (e.g., 8-point, 14-point, etc.) of the text, based on the pertinent call log entries. The examples provided for the tasks depicted in FIG. 6 also apply to task 830, in that terminal 200 might display the text message, for example, in 10-point font for some incoming messages and in 18-point font for some other incoming messages, based on the information in call log 400.

At task 840, processor 302 determines the color (e.g., red, yellow, green, black, etc.) of the text, based on the pertinent call log entries. The call log examples provided for the tasks depicted in FIG. 6 also apply to task 840. For example, terminal 200 might display the text message in red for some incoming messages (such as from a calling party who has called more than ten times in the current day) and in green for some other incoming messages (such as from a calling party who has called less than five times in the current day), based on the information in call log 400.

At task 850, processor 302 determines the additional properties (e.g., presence of supplementary symbols, choice of punctuation, etc.) of the text, based on the call log entries.

At task 860, terminal 200 generates an output notification signal that is based on the text content and properties of tasks 810-850. Terminal 200 synthesizes the visual signal in well-known fashion and in accordance with the illustrative embodiment.

In some embodiments of the present invention, terminal 200 might determine the semantic content of the particular notifying text to be displayed, based on call log 400. For example, terminal 200 determines that an incoming call is from Liz Brown, checks to see how many times Liz Brown has called, and forms the notifying text message "This is the fifth time that the caller has called today." In some embodiments, the name of the originator (e.g., Liz Brown, etc.) is included in the notifying text. As other examples, terminal 200 forms the notifying text message "You instant messaged the caller two days ago" or the message "The caller is calling for the third time, but you have not returned their call," both messages being based on call log 400. It will be clear to those skilled in the art, after reading this specification, how to determine the semantic content of the particular notifying text to be displayed, based on call log 400.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving a first message at a telecommunications terminal; and
   (b) determining the value of a property for a musical composition based on the contents of a call log for messages sent from said telecommunications terminal;
   wherein said musical composition is a ringtone for notifying the user of said telecommunications terminal of the arrival of said first message, and
   wherein a melody of said musical composition is independent of said property.

2. The method of claim 1 wherein said property is one of volume and tempo.

3. The method of claim 1 wherein said property is one of pitch and timbre.

4. The method of claim 1 wherein the determination of said property is also based on an attribute of said first message.

5. The method of claim 1 wherein the determination of said property is also based on the identity of the originator of said first message.

6. The method of claim 1 wherein the determination of said property is also based on the number of times the originator of said first message has attempted to contact the user of said telecommunications terminal during a time interval.

7. The method of claim 1 wherein the determination of said property is also based on the time of the most recent prior communication from the originator of said first message.

8. The method of claim 1 wherein the determination of said property is based on an entry in said call log for a second message that is sent to the originator of said first message.

9. A method comprising:
  (a) receiving a first message at a first telecommunications terminal; and
  (b) determining the value of a property for a musical composition based on the contents of a call log for messages received at a second telecommunications terminal;
  wherein said musical composition is a ringtone for notifying the user of said first telecommunications terminal of the arrival of said first message, and
  wherein a melody of said musical composition is independent of said property.

10. The method of claim 9 wherein the user of said first telecommunications terminal is also the user of said second telecommunications terminal.

11. The method of claim 9 wherein said first message is sent from a telecommunications terminal other than said second telecommunications terminal.

12. The method of claim 9 wherein said property is one of volume and tempo.

13. The method of claim 9 wherein said property is one of pitch and timbre.

14. The method of claim 9 wherein the determination of said property is also based on an attribute of said first message.

15. The method of claim 9 wherein the determination of said property is also based on the identity of the originator of said first message.

16. The method of claim 9 wherein the determination of said property is also based on the contents of a call log for messages received at said first telecommunications terminal.

17. A method comprising:
  (a) receiving a first message at a first telecommunications terminal; and
  (b) determining the value of a property for a musical composition based on the contents of a call log for messages sent from a second telecommunications terminal;
  wherein said musical composition is a ringtone for notifying the user of said first telecommunications terminal of the arrival of said first message, and
  wherein a melody of said musical composition is independent of said property.

18. The method of claim 17 wherein the user of said first telecommunications terminal is also the user of said second telecommunications terminal.

19. The method of claim 17 wherein said first message is sent from a telecommunications terminal other than said second telecommunications terminal.

20. The method of claim 17 wherein said property is one of volume and tempo.

21. The method of claim 17 wherein the determination of said property is also based on an attribute of said first message.

22. The method of claim 17 wherein the determination of said property is also based on the identity of the originator of said first message.

23. The method of claim 17 wherein the determination of said property is also based on the contents of a call log for messages received at said first telecommunications terminal.

* * * * *